United States Patent [19]

Oniki et al.

[11] Patent Number: 4,626,909
[45] Date of Patent: Dec. 2, 1986

[54] VIDEO SIGNAL RECORDING AND REPRODUCING SYSTEM WITH AUTOMATIC CHANNEL AND TIME SELECTION

[75] Inventors: Saburo Oniki, Mamaroneck, N.Y.; Takashi Okada, Yokohama; Takao Mogi, Tokyo, both of Japan

[73] Assignee: Sony Corporation, Tokyo, Japan

[21] Appl. No.: 491,095

[22] Filed: May 3, 1983

[51] Int. Cl.⁴ ............... H04N 7/16; H04B 11/16; G11B 5/02
[52] U.S. Cl. ............... 358/114; 360/27; 455/181; 455/186; 358/122
[58] Field of Search ............... 358/191.1, 335, 122, 358/123, 114; 455/171, 181, 186; 360/27

[56] References Cited

U.S. PATENT DOCUMENTS

| | | | |
|---|---|---|---|
| 4,310,924 | 1/1982 | Miyasaka et al. | 455/181 |
| 4,435,842 | 3/1984 | Mayumi et al. | 455/186 |
| 4,533,949 | 8/1985 | Fujimura et al. | 358/122 |

FOREIGN PATENT DOCUMENTS 55-166389 12/1980 Japan .

OTHER PUBLICATIONS

Zenith Model VR 9775 PT Operating Guide, Part No. 202-4455, Jun., 1982.

*Primary Examiner*—S. C. Buczinski
*Assistant Examiner*—Linda J. Wallace
*Attorney, Agent, or Firm*—Lewis H. Eslinger; Alvin Sinderbrand

[57] ABSTRACT

A video recorder for automatically recording information being broadcast on at least one predetermined channel at a predetermined time comprises a tuner which tunes to any one of a plurality of channels received thereby and includes a channel selector actuable for selecting the predetermined channel, a recorder operable to record information broadcast on the channel to which the tuner is tuned, a timer actuable to cause operation of the recorder at the predetermined time, and a single, manually operable actuating member which simultaneously actuates the channel selector and the timer so that the recorder records the information broadcast on the predetermined channel at the predetermined time.

21 Claims, 10 Drawing Figures

FIG.9
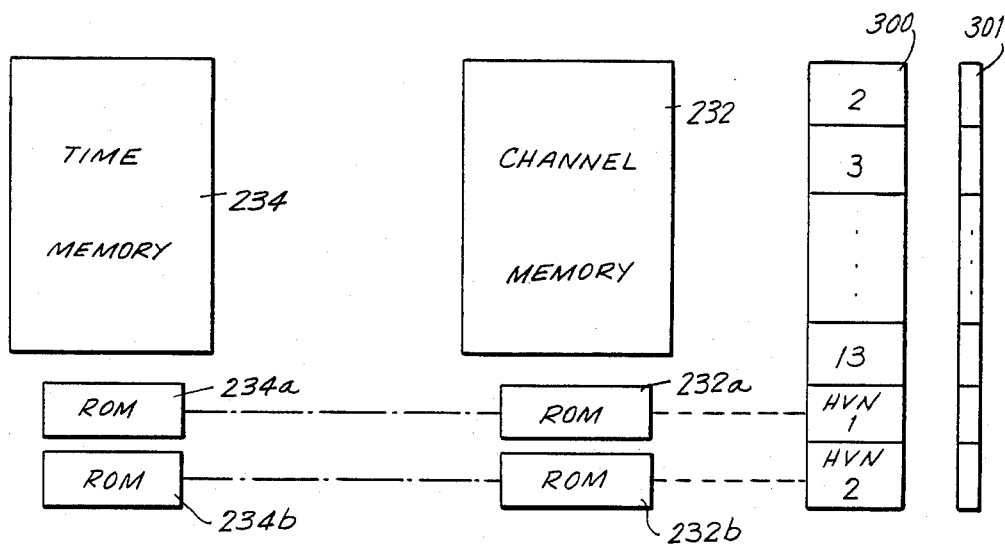
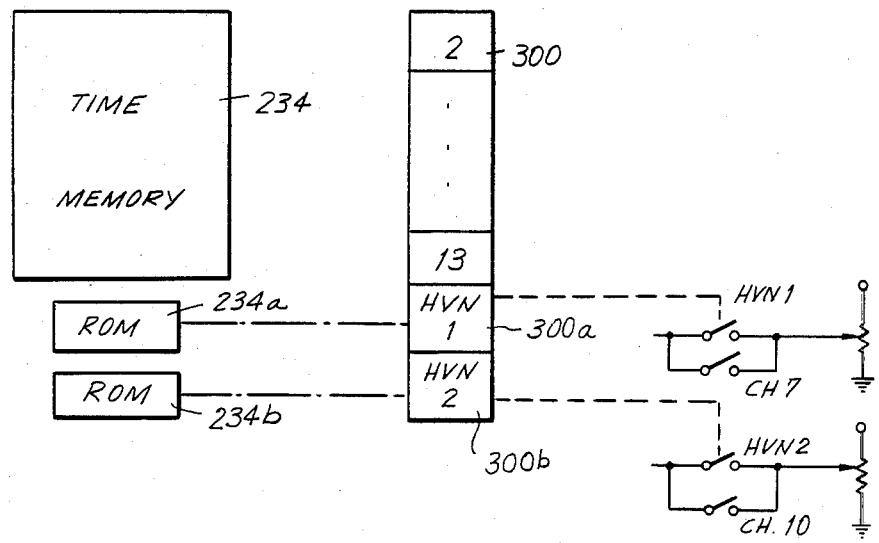
FIG.10

VIDEO SIGNAL RECORDING AND REPRODUCING SYSTEM WITH AUTOMATIC CHANNEL AND TIME SELECTION

BACKGROUND OF THE INVENTION

1. Field of the Invention

This invention relates to information signal recording and reproducing apparatuses, and more particularly, to a video signal recording and reproducing apparatus with automatic channel and time selection capabilities.

2. Description of the Prior Art

In a scrambled or subscriber television receiving system as described in U.S. patent application Ser. No. 06/415,836, filed Sept. 8, 1982, now U.S. Pat. No. 4,533,949, scrambled television program signals are transmitted on a predetermined VHF channel at a predetermined time, preferably, late at night, and are recorded on a video tape recorder. Key signals to be used for descrambling the scrambled television signals are transmitted at the end of the program of scrambled television signals. A user, thus, cannot view the television program in real time, since the key signals for descrambling the scrambled televison program signals are not transmitted until after the program ends.

For example, the scrambled television signals may be transmitted from 2:30 A.M. until 5:30 A.M. on channel 7, and for recording the scrambled television program on a conventional video tape recorder (VTR), the user must preset that time interval and channel number on the video tape recorder.

The system identifed above suffers from significant drawbacks in that the setting of the timer and channel selector are troublesome and inconvenient, particularly as such operations are usually undertaken at bedtime. Further, it is difficult to ascertain whether the timer has in fact been set to cause recording of the scrambled television signal, since the timer is also used for selecting the usual, unscrambled television program signals which are to be recorded.

OBJECTS AND SUMMARY OF THE INVENTION

It is therefore an object of the present invention to provide a video signal recording apparatus which avoids the above-described drawbacks of the prior art system.

It is another object of the present invention to provide a video signal recording apparatus which is simply actuable to automatically select both the time and channel of a predetermined television program which is to be recorded.

It is yet another object of the present invention to provide a video signal recording apparatus which clearly indicates when it is set to record a predetermined television program.

It is still another object of the present invention to provide a video signal recording apparatus which can be conveniently set to subsequently record a scrambled television program.

It is still a further object of the present invention to provide a video signal recording apparatus which can be conveniently preset to automatically record two scrambled television signal programs transmitted at predetermined respective times and/or on different channels.

In accordance with an aspect of the present invention, a video recorder for automatically recording information being broadcast on at least one predetermined channel at a predetermined time comprises tuning means for tuning to any one of a plurality of channels received thereby and including channel selecting means actuable for selecting said one predetermined channel, recorder means for recording information broadcast on the channel to which the tuning means is tuned, timing means actuable for causing operation of the recorder means at said predetermined time, and single, manually operable actuating member for simultaneously actuating the channel selecting means and the timing means so that the recorder means automatically records the information broadcast on the predetermined channel at the predetermined time.

The above, and other objects, features and advantages of the present invention, will be apparent from the following detailed description of illustrative embodiments thereof which is to be read in connection with the accompaning drawings.

BRIEF DESCRIPTION OF THE DRAWINGS

FIG. 9 is a block diagram of memory units in a further embodiment of the present invention; and FIG. 10 is a block diagram of memory units in still a further embodiment of the present invention.

DETAILED DESCRIPTION OF THE PREFERRED EMBODIMENTS

Figure 1:
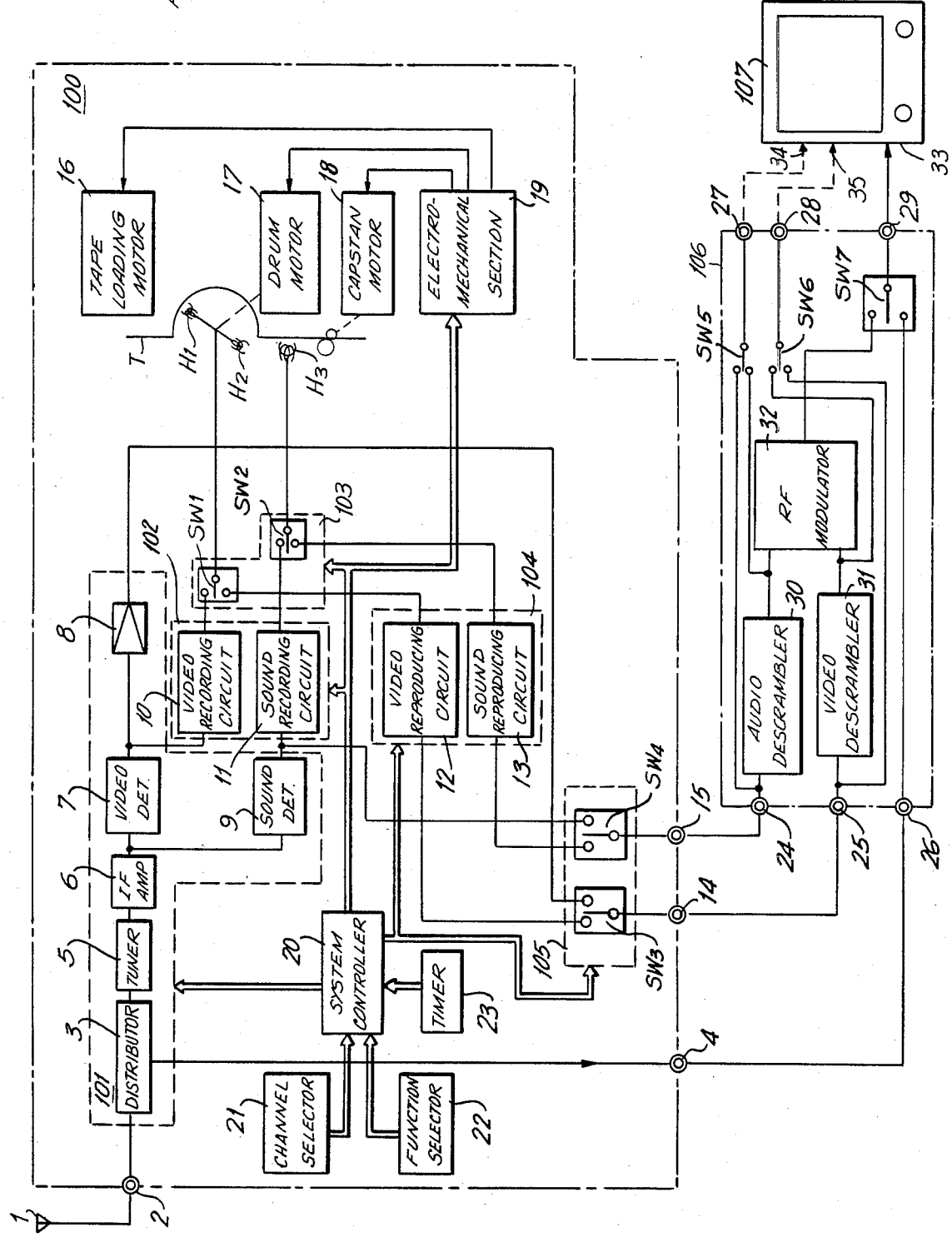
FIG. 1 is a block diagram of a prior art television receiver system for recording and reproducing a scrambled television signal.

Referring to the drawings in detail, and initially to FIG. 1 thereof, it will be seen that a prior art television signal recording and reproducing system is disclosed which is suitable for reproducing a scrambled television signal. The scrambled television signal system is sometimes referred to as a pay television system or a subscriber television system because only paying subscribers to the service are provided with a descrambler for descrambling the scrambled television signal.

In the system shown on FIG. 1, a VHF television signal is received by a VHF antenna 1 and supplied to a VHF input terminal 2 in a video cassette recorder 100. The VHF television signal supplied to VHF input terminal 2 can include both conventional television signals and scrambled television signals. The VHF television signals are supplied from VHF input terminal 2 to a television receiver circuit 101 which detects the video and audio signals included in the VHF television signals supplied thereto. Television receiver circuit 101 conventionally includes a signal distributor 3, a tuner 5, an IF amplifier 6, a video detector 7, an amplifier 8, and a sound detector 9.

The video signal from video detector 7 and the audio signal from sound detector 9 are supplied to a video and audio recording circuit 102. Video and audio recording circuit 102 includes a video recording circuit 10 and a sound recording circuit 11. Video recording circuit 10 supplies a video signal through a switch $SW_1$ to rotary video heads $H_1$ and $H_2$ for recording thereby in skewed parallel tracks on a magnetic tape T when video cassette recorder 100 is operated in a recording mode. Sound recording circuit 11 supplies an audio signal through a switch $SW_2$ to a fixed audio head $H_3$ for recording by the latter in a longitudinal track on magnetic tape T when video cassette recorder 100 is operated in the recording mode.

In the illustrated system, switches $SW_1$ and $SW_2$ are included in a switching circuit 103 connected between video and audio circuit 102 and video and audio heads $H_1$, $H_2$, and $H_3$, respectively. Switches $SW_1$ and $SW_2$ switch video and audio signals to and from video and audio heads $H_1$, $H_2$, and $H_3$, according to the operation of video cassette recorder 100 in the recording or in the reproducing mode.

A video and audio reproducing circuit 104 is also connected through switching circuit 103 to video and audio heads $H_1$, $H_2$, $H_3$. Video and audio reproducing circuit 104 includes a video reproducing circuit 12 which receives the video signal from the video heads $H_1$, $H_2$ through switch $SW_1$ and generates a composite video signal in response thereto. An audio reproducing circuit 13 is also included in video and audio reproducing circuit 104 and receives a reproduced audio signal from audio head $H_3$ through switch $SW_2$ for generating an audio signal in response thereto.

The composite video signal from video reproducing circuit 12 and the audio signal from audio reproducing circuit 13 are supplied to a video and audio switching circuit 105. Video and audio switching circuit 105 includes a video switch $SW_3$ which receives the composite video signal from video reproducing circuit 12 and an amplified video signal from amplifier 8. An audio switch $SW_4$ included in video and audio switching circuit 105, receives, as its input signals, the audio signal from audio reproducing circuit 13 and the audio signal from detector 9. Video and audio switching circuit 105 supplies the selected video and audio signals to video and audio signal output terminals 14, 15, respectively. In the illustrative embodiment, the amplified video signal from amplifier 8 and the audio signal from sound detector 9 are supplied to video and audio output terminals 14, 15 when video cassette recorder 100 is operated in any mode other than the reproducing or playback mode, i.e., when in a recording mode and in a stop mode. In such recording and stop modes, video and audio signals from television receiver circuit 101 are supplied to video and audio signal output terminals 14, 15.

Video cassette recorder 100 includes a tape loading motor 16 for withdrawing magnetic tape T from a video cassette (not shown), a drum motor 17 for rotating a drum which includes video and audio heads $H_1$, $H_2$ and a capstan motor 18 for driving magnetic tape T at a constant speed. Video cassette recorder 100 also includes an electro-mechanical section 19 which receives control signals from a system controller 20 and which operates the various mechanical portions of video cassette recorder 100 in the desired operating modes.

System controller 20 may be a CPU or microprocessor which supervises the various functions and operating modes of video cassette recorder 100. In a preferred embodiment, system controller 20 includes a microcomputer which is responsive to a channel selector 21, a function selector 22, and a timer 23, and which is responsible for operating the entire video cassette recorder 100 in the desired modes.

Channel selector 21 is connected to system controller 20, as aforesaid, and is used to select the various channels to be tuned and recorded by video cassette recorder 100. In a television channel selector 21 according to the prior art, push buttons 300 are provided for choosing channels 2 through 13 and LED's 301 are associated with the push-buttons 300 to be illuminated for indicating the respective channel has been selected. It is to be appreciated that channel selector 21 operates through system controller 20 to control the channel signal tuned by tuner 5.

Function selector 22 supplies control signals to video cassette recorder 100 through system controller 20 and can be conventionally constructed for selecting various functions or operating modes, such as, for example, playback, record, stop, fast forward, rewind and picture search.

The composite video signal from video signal output terminal 14 and the audio signal from audio signal output terminal 15 are supplied to a descrambler 106. The audio signal from audio signal input terminal 24 is supplied to an audio descrambler 30, an RF modulator 32, and thence, to a switch $SW_7$. When the audio signal from audio signal input terminal 24 is not scrambled, it is supplied directly to a switch $SW_5$ and thence, to an audio signal output terminal 27. A scrambled video signal from video signal input terminal 25 is supplied to a video descrambler 31 and then, to RF modulator 32. The descrambled video signal is also supplied from video descrambler 31 to a switch $SW_6$ and thence, to a video signal output terminal 28. An unscrambled television signal is also supplied from video signal input terminal 25 to switch $SW_6$. A VHF output signal from signal distributor 3 is supplied to a VHF antenna terminal 4. The output signal from VHF antenna terminal 4 is supplied to a VHF input terminal 26. The signal from VHF input terminal 26 is supplied to switch $SW_7$. Switch $SW_7$ alternately supplies the output signal from RF modulator 32 and the VHF signal from VHF input terminal 26 to a VHF output terminal 29. In the illustrated system, switches $SW_5$ and $SW_6$ are ganged and supply video and audio signals from video and audio signal input terminals 24, 25 directly to video and audio signal output terminals 27 and 28 when the input signals are conventional television signals. When the input signals are scrambled television signals, switches $SW_5$ and $SW_6$ supply the descrambled signals to video and audio signal output terminals 27, 28.

Switch $SW_7$, which can be manually operated, supplies VHF signals from VHF input terminal 26 to VHF output terminal 29 when the input VHF signals are conventional television signals. When scrambled television signals are selected, switch $SW_7$ selects the RF modulated video and audio signals from RF modulator 32 to be supplied to VHF output terminal 29.

A television monitor 107 is coupled to descrambler 106 and permits a viewer to view the unscrambled television signals supplied thereto. A conventional television receiver does not have audio and video input terminals. Therefore, VHF output terminal 29 of descrambler 106 is connected to an input antenna terminal 33 of a conventional television receiver when the latter is used as television monitor 107. If television monitor 107 has audio and video input terminals 34, 35, respectively, audio and video signal output terminals 27, 28 of descrambler 106 can be directly connected thereto, as indicated by the dotted lines in FIG. 1.

Figures 2, 3:
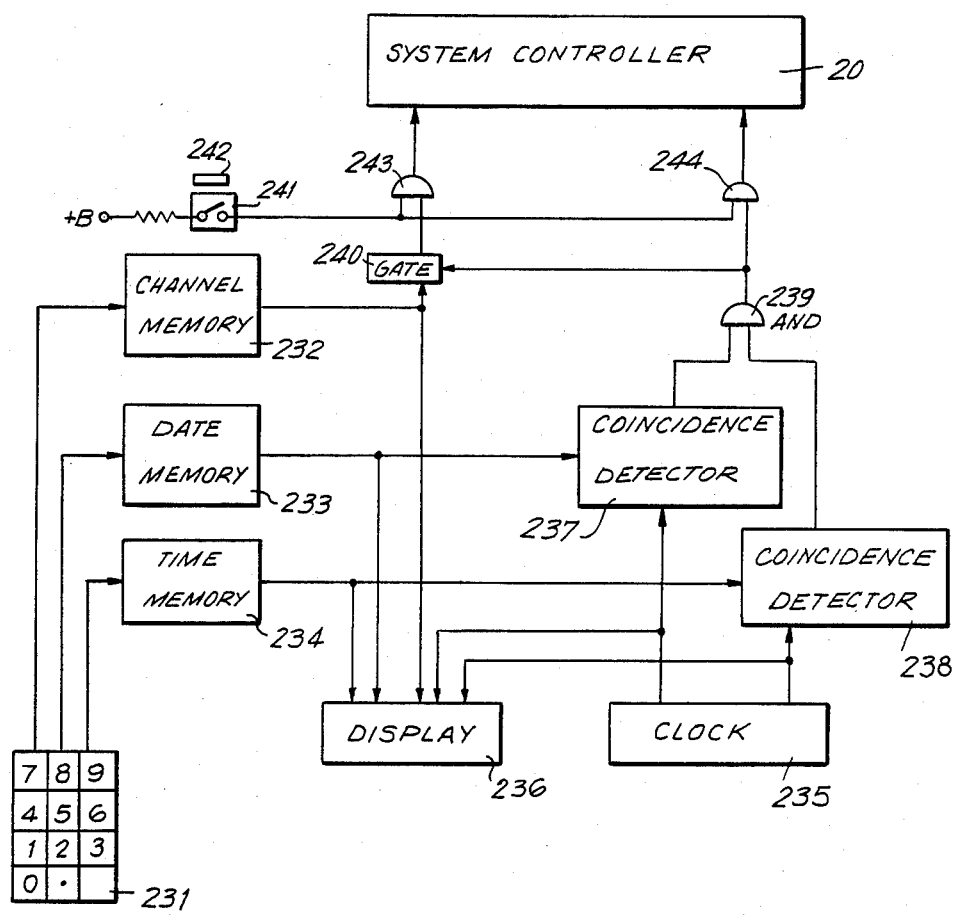
FIG. 2 schematically illustrates a prior art television channel selector for use with the system of FIG. 1.
FIG. 3 is a block diagram of a prior art timer included in the television signal receiving system of FIG. 1.

The prior art timer of FIG. 3 is connected to system controller 20 and can be preset so that video cassette recorder 100 of FIG. 1 will record a desired television program which is transmitted on a predetermined channel, at a predetermined date, and time. The timer of FIG. 3 includes a keyboard 231 which can be used to preset the channel, date and time for the television program to be recorded. A channel memory 232, which may be a random access memory (RAM), is connected to keyboard 231 and stores the channel numbers for selected television programs. A date memory 233, which may be another RAM, is connected to keyboard 231 and stores date information which corresponds to the channel information stored in memory 232 for the selected programs. A time memory 234, which may also be another RAM, is connected to keyboard 231 and stores time information corresponding to the channel and date information or in memories 232 and 233 for the selected television programs.

In the illustrated prior art timer, time memory 234 can store both the start time and the end time of each period during which video cassette recorder 100 is to be operated, or memory 234 may store only the start time of each recording operation of video cassette recorder 100. It is to be appreciated that prior art video tape recorders automatically shut-off when the end of the tape is sensed.

The timer of FIG. 3 further includes a clock 235 which provides time and date information, and a display 236 which indicates the current time and date information from clock 235. Display 236 can also indicate the channel, date and time information entered from keyboard 231 and stored in channel memory 232, date memory 233 and time memory 234. A first coincidence detector 237 is coupled to date memory 233 and clock 235 for providing a digital "1" signal when the date data stored in date memory 233 coincide with the current date data from clock 235. A second coincidence detector 238 is connected to time memory 234 and clock 235, and generates a digital "1" signal when the time data in time memory 234 coincide with the current time data from clock 235. An AND gate 239 receives the output signals from first and second coincidence detectors 237, 238 and supplies a digital "1" signal when the signals supplied thereto coincide, i.e., AND gate 239 supplies a "1" as its output signal when the stored date and time data coincide with the current date and time data, respectively. A gate circuit 240 is connected to channel memory 232 and the output terminal of AND gate 239. Gate circuit 240 supplies channel data from channel memory 232 when the output signal of AND gate 239 is "1", that is, when both the date and time data stored in the respective memories 233, 234 coincide with the current date and time.

A push-button actuated switch 241 is actuated whenever it is desired to operate video cassette recorder 100 in accordance with the data stored in channel memory 232, date memory 233 and time memory 234. An LED indicator 242 is associated with push-button actuated switch 241 and indicates when video cassette recorder 100 is set to operate in accordance with the stored data. An AND gate 243 is connected to receive the output signals from gate circuit 240 and switch 241 and can supply an output signal to system controller 20 only when switch 241 has been actuated. An AND gate 244 is connected to receive the output signals from AND gate 239 and timer set switch 241, and AND gate 244 can supply an output signal to system controller 20 only when switch 241 has been actuated.

System controller 20 receives selected channel data from AND gate 243 and time data from AND gate 244 when channel, date and time data are entered by keyboard 231 into memories 232, 233, 234 and switch 241 is actuated. System controller 20 generates control signals to place video cassette recorder 100 in a recording mode at the selected time.

Figure 4:
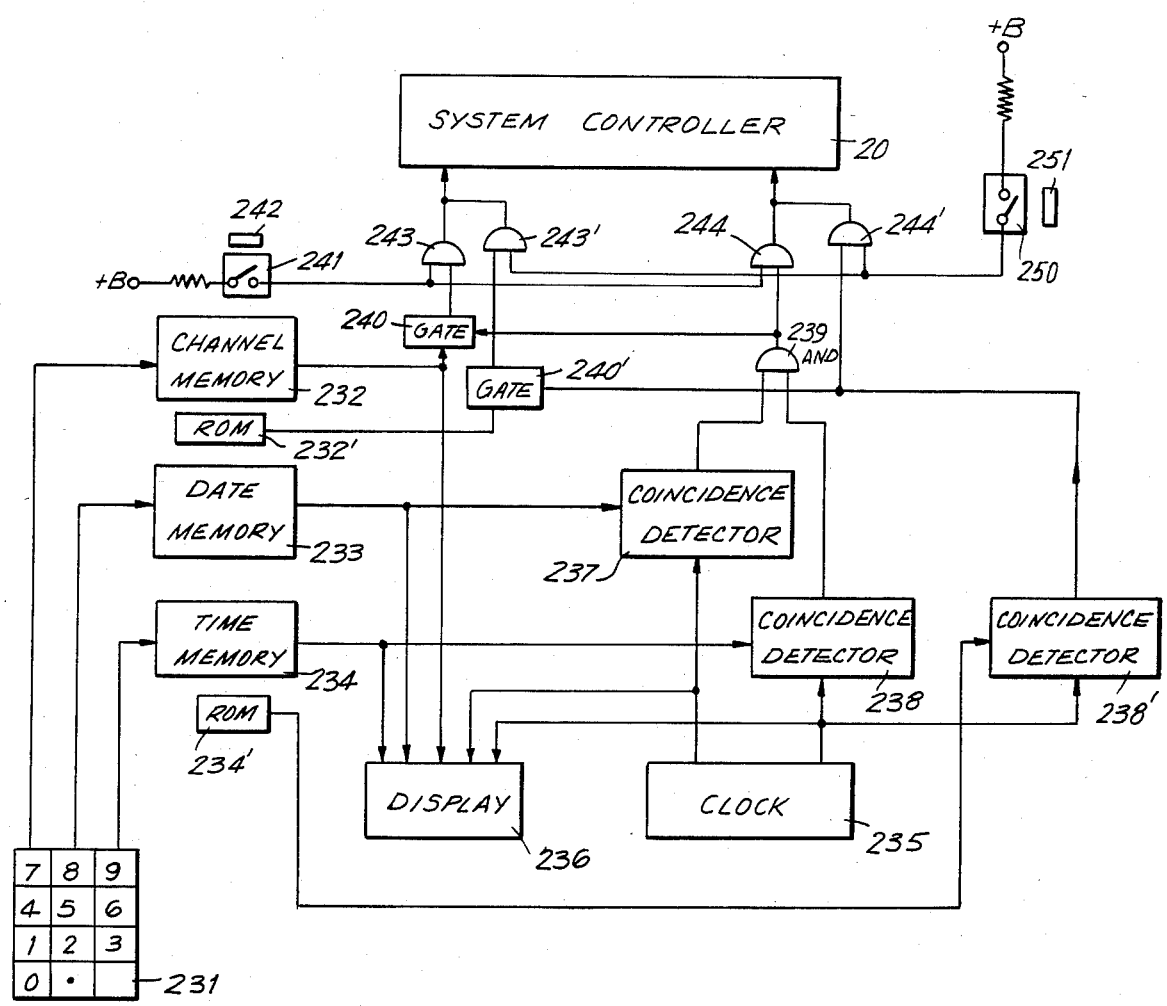
FIG. 4 is a block diagram similar to that of FIG. 4, but showing an embodiment of the present invention.

The timer circuit according to the embodiment of this invention shown on FIG. 4 shares many of the component parts or elements of the prior art timer circuit of FIG. 3, and such parts or elements are identified by the same reference numerals and will not be further described for the sake of brevity. The timer circuit of FIG. 4 is shown to further include a read only memory (ROM) 232' which stores a channel control signal corresponding to the channel on which a scrambled television signal will be broadcast for recording. For example, the scrambled television signal may be transmitted on channel 7, so that ROM 232' stores a channel control signal corresponding to channel 7. A second read only memory (ROM) 234' stores time information corresponding to the time when the scrambled television signal will be broadcast. For example, if the scrambled television signal is broadcast from 2:30 A.M. to 5:30 A.M., ROM 234' stores corresponding time control signals.

A coincidence detector 238' receives time data from ROM 234' and current time data from clock 235. Coincidence detector 238' generates an output signal of "1" when the time data stored in ROM 234' coincides with current time data supplied from clock 235. A gate circuit 240' is gated by the output signal "1" from coincidence detector 238' for passing the channel control signal from ROM 232' to an AND circuit or gate 243'. Gate circuit 240' permits the channel control signal to be supplied from ROM 232' to system controller 20 only when the predetermined time from ROM 234' coincides with the current time.

A selector 250, which is shown as a switch in the illustrated embodiment, is actuable to select the predetermined channel over which the scrambled television signal is transmitted. In the preferred embodiment, selector 250 is associated with a respective push button 300a (see FIG. 5) which may be proximate to the array of push buttons 300 of a conventional channel selector. Button 300a, however, is labeled to indicate that it is actuable for achieving recording of the scrambled television signal. In the illustrated embodiment, button 300a is labeled HVN, corresponding to, for example, the Home Video Network. An LED indicator 251 is associated with selector 250 and is illuminated when selector 250 is actuated for achieving recording of the Home Video Network signal. The LED indicator 251 associated with selector 250 may be similarly positioned in the array of LED's 30 associated with the conventional channel selecting push-button, as at 301a on FIG. 5.

AND gate 243', receives, at one input terminal, a signal from selector 250 and, at its other input terminal, the output signal from gate circuit 240'. An AND gate 244' also receives, at one input terminal, the signal from selector 250 and, at its other input terminal, the output signal from coincidence detector 238'. AND gates 243' and 244' supply respective control signals to system controller 20 when the Home Video Network signal has been selected, and when the current time coincides with the predetermined time at which that signal is broadcast.

In the embodiment of FIG. 4, the channel and time data corresponding to the Home Video Network signal are stored in ROM's 232', 234' at the factory since they are read only memories and cannot be changed. Accordingly, a user need only actuate the Home Video Network button 300a in order to insure that the scrambled television signal will be recorded at such future time when it is broadcast. In the preferred embodiment, selector switch 250 (associated with Home Video Network button 300a) is positioned proximate channel selector 21 and/or function selector 22 (see FIG. 1) so that a user is not particularly aware that an operation of timer 23 is called for when selector 250 is actuated to provide for recording of the Home Video Network signal. It is to be appreciated that a user thus regards the Home Video Network button 300a merely as a channel or function selector and is not concerned with the time when the Home Video Network program is broadcast. It will be appreciated that, if desired, selector switch 250 may be mechanically or otherwise ganged with switch 241 to open the latter when switch 250 is closed, whereby to prevent interference of any other preset channel selection with the desired recording of the scrambled television signal program.

Figure 5:
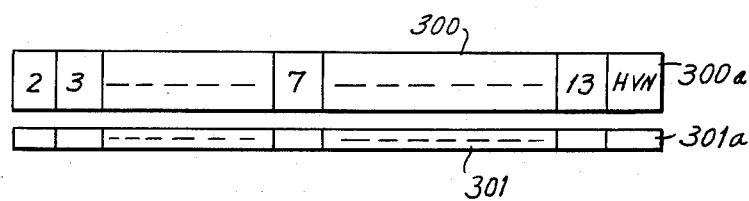
FIG. 5 schematically illustrates a television channel selector that may be associated with the timer of FIG. 4 in accordance with the present invention.

It is to be noted that, in the embodiment of FIG. 5, the Home Video Network button 300a is provided as one of the push button elements in a channel selector. In such case, the Home Video Network button 300a is itself indistinguishable from the other channel selection buttons, and, thus, may be as easily and casually actuated as any of such other channel selection buttons. Of course, as earlier noted, the Home Video Network button 300a is identified by a suitable legend and, when that button is actuated, a user can easily recognize, by illumination of the respective LED at the position 301a, that video cassette recorder 100 has been preset to record the scrambled television signal when the latter is broadcast.

Figure 6:
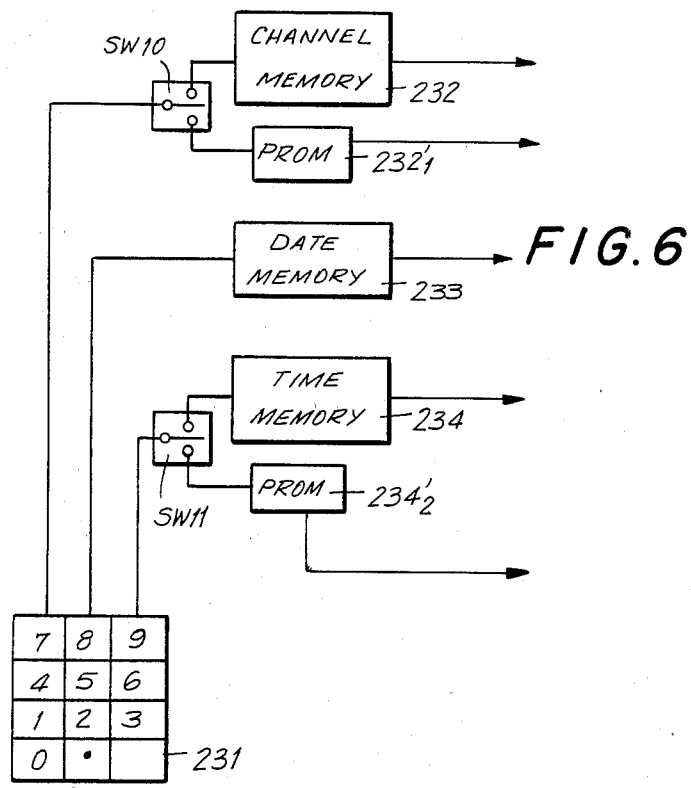
FIG. 6 is a block diagram of a portion of another embodiment of a timer in accordance with the present invention.

In the embodiment of the invention shown on FIG. 6, and which is otherwise similar to that of FIG. 4, programmable read only memories (PROM's) $232_1'$ and $234_1'$ which replace ROMs 232' and 234' are rewritable or changeable non-volatile units. Accordingly, keyboard 231 is selectively coupled to PROM's $232_1'$ and $234_1'$ or to the channel and time memories 232 and 234 through respective switches $SW_{10}$ and $SW_{11}$ used for entering time and channel data. MNOS memory units are suitable for use as the rewritable or changeable non-volatile PROM's $232_1'$ and $234_1'$.

Figure 7:
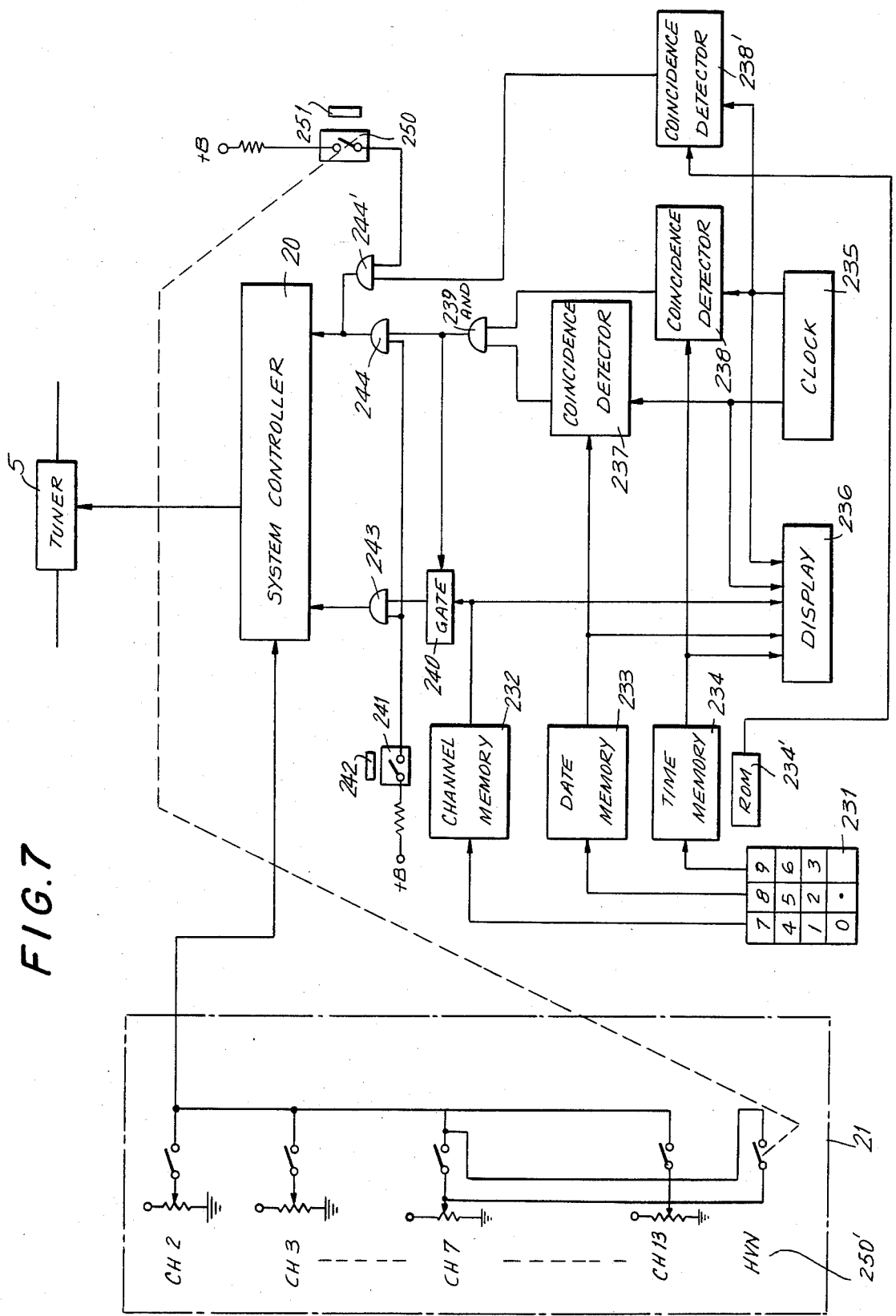
FIG. 7 is a block diagram of still another embodiment of a timer in accordance with the present invention.

In the embodiment of the invention shown on FIG. 7, and which is otherwise similar to the embodiment of FIG. 4, ROM 232', which stores the channel control signals corresponding to the Home Video Network channel, is eliminated by ganging selector switch 250 with a switch 250'. In the illustrated embodiment, the Home Video Network channel (HVN) corresponds, for example, to channel 7. While selector switch 250 is shown located a distance from switch 250' in FIG. 7, they are mechanically or otherwise ganged so that actuation of selector switch 250 also actuates switch 250'. Thus, it will be appreciated that the channel information is mechanically "memorized" by the actuation of switch 250' upon or in response to the actuation of selector switch 250.

Figure 8:
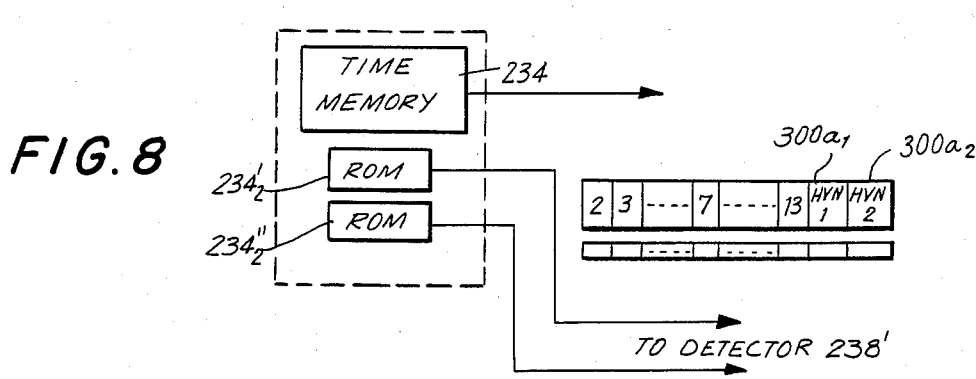
FIG. 8 is a block diagram of a memory unit included in a timer according to yet another embodiment of the present invention.

In the embodiments described above, only one scrambled television signal is transmitted at a time. Accordingly, only one set of time data is stored in ROM 234'. However, it is to be appreciated that a plurality of scrambled television signal programs can be transmitted at different times. For example, FIG. 8 schematically illustrates an embodiment of the present invention in which two scrambled television signal programs indicated by $HVN_1$ and $HVN_2$ are transmitted at two different times. Accordingly, two sets of time data are stored in respective ROM's $234_2''$ and $234_2'$ and such time data are selectively applied to coincidence detector 238' on FIG. 4 in response to the selective actuation of push buttons $300a_1$, and $300a_2$ for selecting the programs $HVN_1$ and $HVN_2$, respectively. It is to be further appreciated that additional ROM's and selector buttons can be added according to the number of scrambled television programs which are broadcast.

In the embodiments described above, it has been assumed that only one VHF channel transmits the scrambled television signal. However, a plurality of VHF channels can, of course, broadcast a plurality of scrambled television signal programs. Accordingly, as illustrated schematically on FIG. 9, a plurality of ROM's can be provided for channel and time data corresponding to a plurality of scrambled television signal programs. More particularly, in the embodiment of FIG. 9, in which two scrambled television signal program are broadcast on two respective VHF channels, ROM 234a supplies the time data for the first scrambled television signal program identified as $HVN_1$ and ROM 232a supplies the channel data corresponding to $HVN_1$. Further, in FIG. 9, ROM 234b supplies time data for the second scrambled television signal identified as $HVN_2$ and ROM 232b supplies the channel data for $HVN_2$.

In the embodiment of FIG. 10, the channel memories 232a, 232b of FIG. 9 have been eliminated, and the channel information for the programs $HVN_1$ and $HVN_2$ is mechanically "memorized" in response to actuation of selector buttons 300a and 300b which are labeled $HVN_1$ and $HVN_2$. As shown by way of example, the push buttons 300a and 300b may be operable to mechanically close normally open switches which are in parallel with the channel selecting switches for selecting channels 7 and 10, respectively. In that case, it is assumed that the programs $HVN_1$ and $HVN_2$ of scrambled television signals are broadcast on channels 7 and 10, respectively.

It is to be appreciated that the present invention is applicable not only to pre-engaging a particular channel over which a scrambled television signal is broadcast late at night, as in a pay or subscriber television system, but may also be applied to any other system in which it is desired to pre-select a channel and time for a particular series of programs.

Although specific embodiments of the present invention have been described in detail herein with reference to the accompaning drawings, it is to be understood that the invention is not limited to those precise embodiments, and that various changes and modifications may be effected therein by one skilled in art without departing from the spirit and scope of the invention as defined in the appended claims.

What is claimed is:

1. A video recorder for automatically recording information being broadcast on at least one predetermined channel at a predetermined time for at least two predetermined days, comprising:

tuning means for tuning to any one of a plurality of channels received thereby and including channel selecting means for selecting one of said channels;

recorder means for recording information broadcast on the channel to which said tuning means is tuned;

timing means actuable for causing operation of said recorder means at least one selected time in accordance with channel and timing information input to said timing means for said at least one selected time;

override means for controlling said tuning means and said recorder means in preference to said channel selecting means and said timing means and including memory means for storing said predetermined time for said predetermined days and said one predetermined channel; and a single manually operable actuating member for actuating said override means without causing actuation of said timing means to override said channel selecting means and said timing means so that said recorder means records information on said one predetermined channel at said predetermined time on the next occurring predetermined day following actuation of said member;

said timing means being actuable without causing actuation of said override means.

2. The video recorder of claim 1; wherein said memory means includes time memory means for storing time control signals corresponding to said predetermined time for said predetermined days.

3. The video recorder of claim 2; wherein said memory means includes channel memory means for storing channel control signals corresponding to said one predetermined channel.

4. The video recorder of claim 2; wherein said time memory means comprises programmable memory means for varying said predetermined time.

5. The video recorder of claim 4; further comprising programming means for programming said predetermined time stored in said programmable memory means.

6. The video recorder of claim 5; further comprising memory means connected to said channel selecting means for storing channel control signals corresponding to each of said plurality of channels selected by said channel selecting means and said selector means.

7. The video recorder of claim 1; wherein said channel selecting means includes a plurality of regular channel control elements each corresponding to one of said plurality of channels on which regular programs are broadcast; and wherein said actuating member includes an additional channel control element similar to said channel control elements and being operable for selecting said one predetermined channel.

8. The video recorder of claim 7; wherein actuation of said additional channel control element deactivates said regular channel control elements whereby said tuning means tunes only to said one predetermined channel.

9. The video recorder of claim 7; wherein said additional channel control element and said regular channel control elements include respective manually actuable push button means.

10. The video recorder of claim 7; further comprising manually operable means connected to said additional channel control element for actuating said tuning means to tune to said one predetermined channel.

11. The video recorder of claim 1; further comprising a second manually operable actuating member for actuating said override means without causing actuation of said timing means, said memory means storing a second predetermined time for at least two second predetermined days, and said override means being responsive to actuation of said second manually operable actuating member so that said recorder means records said information broadcast on said at least one predetermined channel at said second predetermined time differing from the first-mentioned predetermined time on the next occurring second predetermined day following actuation of said second member.

12. The video recorder of claim 11; wherein said memory means includes time memory means for storing first and second time control signals corresponding to said first predetermined time for the first-mentioned predetermined days, and to said second predetermined time for said second predetermined days respectively.

13. The video recorder of claim 1; further comprising a second manually operable actuating member for actuating said override means, said memory means including time memory means for storing first and second time control signals corresponding to the first-mentioned predetermined time and a second predetermined time, respectively, and channel memory means for storing first and second channel control signals corresponding to said one predetermined channel and a second predetermined channel, said override means being responsive to actuation of said second manually operable actuating member so that said recorder means records said information broadcast on said second predetermined channel at said second predetermined time.

14. The video recorder of claim 13; further comprising means connected to said manually operable first and second actuating members for mechanically actuating said tuning means to tune to said one predetermined channel and said second predetermined channel, respectively.

15. The video recorder of claim 12, in which said time memory means is programmable to vary said first and second predetermined times; and further comprising programming means for programming said first and second control signals stored in said time memory means.

16. Video recording and reproducing apparatus for use in a pay television system in which scrambled television signal programs followed by a descrambling code signal are broadcast on a predetermined channel at a predetermined time on at least two predetermined days for recording by said video recording and reproducing apparatus, and a descrambler uses said code signal for descrambling said scrambled television signal when the latter is reproduced, said apparatus comprising:

tuning means for tuning to any one of a plurality of channels received thereby and including channel selecting means actuable for selecting said predetermined channel on which the scrambled television signal program and code signal are broadcast;

recorder means for recording information broadcast on the channel to which said tuning means is tuned;

timing means actuable for causing recording operation of said recoder means at at least one selected time in accordance with channel and timing information input to said timing means for said at least one selected time;

override means for controlling said tuning means and said recorder means in preference to said channel selecting means and said timing means and including memory means for storing said predetermined time for said predetermined days, and said one predetermined channel; and a single manually operable actuating member for actuating said override means without causing actuation of said timing means to override said channel selecting means and said timing means so that said recorder means records said scrambled television signal programs and said descrambling code signal broadcast on said at least one predetermined channel at said predetermined time on a next occurring predetermined day following actuating of said member;

said timing means being actuable without causing actuation of said override means.

17. The apparatus of claim 16; further comprising time memory means included in said timing means for storing time control signals corresponding to said predetermined time for said predetermined days.

18. The apparatus of claim 17; further comprising channel memory means included in said timing means for storing channel control signals for tuning to said one predetermined channel.

19. The apparatus of claim 18; in which first and second scrambled television signal programs are broadcast at first and second predetermined times on first and second predetermined groups of days, respectively, each group including at least two days; and further comprising time memory means included in said timing means for storing time control signals corresponding to said first and second predetermined times for first and second groups of days.

20. The apparatus of claim 19; further comprising channel memory means included in said timing means for storing channel control signals for tuning to predetermined channels on which said first and second scrambled television signals programs are respectively broadcast.

21. The video recorder of claim 13, in which said time memory means is programmable to vary said first and second predetermined times and said channel memory means is programmable to vary said one predetermined channel and said second predetermined channel, and further comprising programming means for programming said first and second time control signals and said first and second channel control signals stored in said time memory means and said channel memory means, respectively.

* * * * *